(12) United States Patent
Matsumoto

(10) Patent No.: US 7,373,022 B2
(45) Date of Patent: May 13, 2008

(54) APPARATUS AND METHOD FOR REPRODUCING IMAGE

(75) Inventor: Toshihiko Matsumoto, Tokyo (JP)

(73) Assignee: Sony Corporation (JP)

( * ) Notice: Subject to any disclaimer, the term of this patent is extended or adjusted under 35 U.S.C. 154(b) by 617 days.

(21) Appl. No.: 11/070,426

(22) Filed: Mar. 2, 2005

(65) Prior Publication Data
US 2005/0210388 A1 Sep. 22, 2005

(30) Foreign Application Priority Data
Mar. 5, 2004 (JP) ............................. 2004-062743

(51) Int. Cl.
*G06K 9/60* (2006.01)
(52) U.S. Cl. ..................... 382/305; 382/278; 382/294; 382/298
(58) Field of Classification Search ................ 382/278, 382/284, 294, 298
See application file for complete search history.

(56) References Cited

U.S. PATENT DOCUMENTS

| 5,995,095 | A | 11/1999 | Ratakonda | |
|---|---|---|---|---|
| 6,222,532 | B1 | 4/2001 | Ceccarelli | |
| 6,396,505 | B1 * | 5/2002 | Lui et al. | 345/613 |
| 6,509,904 | B1 * | 1/2003 | Lam | 345/613 |
| 6,542,161 | B1 * | 4/2003 | Koyama et al. | 345/589 |
| 6,756,992 | B2 * | 6/2004 | Toji et al. | 345/613 |
| 7,034,788 | B2 * | 4/2006 | Someya et al. | 345/89 |
| 2001/0028787 | A1 | 10/2001 | Nomura et al. | |
| 2003/0229894 | A1 | 12/2003 | Okada et al. | |

FOREIGN PATENT DOCUMENTS

| FR | 2 824 690 A1 | 11/2002 |
|---|---|---|
| JP | 06-153155 A | 5/1994 |
| JP | 11-039846 A | 2/1999 |
| JP | 2001-218164 A | 8/2001 |
| JP | 2001-257968 A | 9/2001 |
| JP | 2002-027411 A | 1/2002 |

OTHER PUBLICATIONS

Hanjalic, A. et al., "Automation of Systems Enabling Search on Stored Video Data", Feb. 13, 1997, Proceedings of the SPIE, pp. 427-438.

* cited by examiner

*Primary Examiner*—Yosef Kassa
(74) *Attorney, Agent, or Firm*—Lerner, David, Littenberg, Krumholz & Mentlik, LLP

(57) ABSTRACT

An apparatus reproduces an image recorded with a difference between adjacent frames at at least one scene change point and scaled-down images for identifying each scene change point. A time-length-determining device determines the length of time to display the scaled-down images, the length of time corresponding to the frame length of a screen of a display device in which the image is displayed. An image-number-determining device determines the number of scaled-down images to be displayed during the length of time. A threshold-value-setting device sets a threshold value for the differences recorded during the length of time to allow a number of scaled-down images corresponding to the number of scaled-down images determined by the image-number-determining device to be extracted. A controlling device controls operations of the display device to reproduce and display the scaled-down image corresponding to the at least one scene change point with the scaled-down image being synchronized with the image, the scaled-down image having a difference between adjacent frames of at least the threshold value.

7 Claims, 9 Drawing Sheets

APPARATUS AND METHOD FOR REPRODUCING IMAGE

CROSS REFERENCE TO RELATED APPLICATIONS

The present invention claims priority from Japanese Patent Application No. 2004-062743 filed Mar. 5, 2004, the disclosure of which is hereby incorporated by reference herein.

BACKGROUND OF THE INVENTION

The present invention relates to an apparatus and a method for reproducing an image. More particularly, it relates to an apparatus and a method for reproducing an image of interest by displaying scaled-down images created from images and selecting one or more of the images from the scaled-down images.

In the past, many methods have been proposed for reproducing an image of interest rapidly by displaying scaled-down images (thumbnail images) created from a first frame image in each scene or the like as an index for searching the image of interest.

Alternatively, in order to display thumbnail images as an index for searching the image of interest, a method for recording an image has been known in which brightness histograms are taken of plural frames forming a moving image on recording images (moving images); if the difference in the histograms between a current frame and a previous frame exceeds a predetermined threshold value, it is determined that the scene has been changed, and thumbnail images are generated from frames representative of the scene and the thumbnail images are recorded with their scene change points.

When reproducing the images recorded on a recording medium, such as a digital versatile disc (DVD), as content according to the past image-recording method, each image is reproduced starting at the scene change point corresponding to a start point of the scene if a thumbnail image for the scene of interest is selected from among plural thumbnail images which are reproduced and displayed as an index for searching the image of interest. Thus, simply selecting the thumbnail image allows the scene of interest to be viewed from its start point, thereby grasping the content in the scene (see Japanese Patent Application Publication No. 2002-27411).

As shown in FIG. 1, thumbnail images Th, each for searching the image of interest, and a reproduced image M11 are displayed on the same screen with each of the thumbnail images Th and the image M11 being synchronized with each other, so that scenes before and after the reproduced image M11 can be viewed preceding a fast-forward or reverse movement, thereby making it convenient for a user to perform the fast-forward or reverse movement. In a case where an image is reproduced, as shown in FIG. 1, even if the image M11 is being reproduced by selecting the thumbnail image Th11, it is possible to change the reproduction start point promptly by selecting the thumbnail Th12, for example. Thus, any scene recorded before the reproduced image M11 has been recorded can be reproduced and displayed rapidly, thereby enhancing its convenience.

Processing in an application such that an image (a video image) and the thumbnail images in content are displayed in synchronization with each other places a large load on a CPU. This may require a CPU having a fast operating speed. An embedded apparatus in which a device for recording/reproducing an image (for example, a video device) is incorporated in a television receiver or the like often uses a CPU having a relatively slow operation speed. Thus, it may be difficult to reproduce and display all the thumbnail images, which have been recorded in a recording medium as content together with the video images, with each of the thumbnail images being synchronized with the video image.

If a CPU having a relatively slow operating speed is used, it is necessary to take processing time of about one second in order to reproduce and display thumbnail images each having 100 pixels. Thus, when reproducing and displaying the thumbnail images by taking the horizontal scanning direction of an image display screen as a time axis, it is possible to display five through seven thumbnail images with each of them being synchronized with the video image if each thumbnail image has about 120 pixels.

FIG. 2 shows a graph G10 where a fixed threshold value is set for selecting the number of thumbnail images capable of being displayed from all of the recorded thumbnail images. In FIG. 2, the horizontal axis is taken as time T and the vertical axis is taken as the difference in brightness histogram between the current frame and the previous frame so that the differences between scene change points are illustrated.

If, for example, six thumbnail images capable of being displayed are selected from all of the thumbnail images recorded as content during the time T, it is conceivable that a fixed threshold value TF is set for the differences in the brightness histograms in the graph G10 of FIG. 2, and the thumbnail images Th13 through Th18 corresponding to the differences D13 through D18 that exceed the fixed threshold value TF are extracted. Avoiding the reproduction and display of the thumbnail images corresponding to the differences that do not exceed the fixed threshold value TF enables a reduction in the number of the thumbnail images capable of being displayed on the screen with each of them being synchronized with the video image. This allows the load on the CPU to be decreased.

If, however, a fixed threshold value TF is set over all of the content to limit the number of thumbnail images, the content may include a section A in which there are only low difference values (scene change levels) and a section B in which there are high difference values, as shown in FIG. 2. The thumbnail images can be extracted from section B, but no thumbnail images can be extracted from section A. Therefore, as shown in FIG. 3, when reproducing and displaying the thumbnail images for the time length T corresponding to a horizontal frame length of the display screen, the thumbnail images Th13 through Th18 are densely displayed in a latter half of the time length T.

When many scene changes occur so that plural thumbnail images can be displayed in a short time, the thumbnail images may be overlapped with each other. Thus, thumbnail images such as Th13, Th14, Th15, and Th17 may be only partially displayed. In particular, it may be difficult to grasp the contents of the scene from the thumbnail image, like the thumbnail image Th15, a large part of which is covered by the other thumbnail image Th16, and select the scene of interest.

If a single fixed threshold value TF is set, the number of thumbnail images to be displayed can be reduced during a period of time when the scenes are changing frequently so that the load on the CPU can be reduced. During a period of time when the scenes are changing infrequently, no thumbnail image may be displayed according to the level of the fixed threshold value TF, although it may be possible to display a large number of thumbnail images based on the processing power of the CPU. Thus, because of an imbalance in the number of scene change points, there is an issue that an unevenness in the time to display the thumbnail images occurs.

It is desirable to present an apparatus and a method for reproducing an image or the like by which loads on the thumbnail image display processing is reduced and the unevenness in the time to display the thumbnail images because of an imbalance in the number of scene change points decreases.

SUMMARY OF THE INVENTION

According to an embodiment of the present invention, there is provided an apparatus for reproducing an image. The image is recorded with a difference between adjacent frames at at least one scene change point and a scaled-down image for identifying each scene change point. The image is to be displayed on a screen of a display device. The apparatus has a time-length-determining device operable to determine a length of time to display the scaled-down image, the length of time corresponding to a frame length of the display device screen. The apparatus also has an image-number-determining device operable to determine a number of scaled-down images to be displayed during the length of time. The apparatus further has a threshold-value-setting device operable to set a threshold value for the difference between adjacent frames, the difference being recorded during the length of time to allow a number of scaled-down images corresponding to the number of scaled-down images determined by the image-number-determining device to be extracted. The apparatus also has a controlling device. The controlling device is operable to control operation of the display device to reproduce and display the scaled-down image corresponding to the at least one scene change point with the scaled-down image being synchronized with the image. The scaled-down image has a difference between adjacent frames of at least the threshold value.

In the embodiment of the present invention, when reproducing an image recorded with a difference between adjacent frames at at least one scene change point and a scaled-down image for identifying each scene change point, the time-length-determining device determines a length of time to display the scaled-down image(s), and the length of time corresponding to the frame length of a screen of a display device in which the image is to be reproduced and displayed. The image-number-determining device determines a number of scaled-down image(s) to be displayed during the length of time thus determined. The threshold-value-setting device then sets a threshold value(s) for the difference(s) between the adjacent frames recorded during the length of time, thereby allowing a number of scaled-down image(s) corresponding to the number of scaled-down image(s) determined by the image-number-determining device to be extracted. The controlling device controls operation(s) of the display device to reproduce and display the scaled-down image(s) corresponding to the at least one scene change point with each of the scaled-down image(s) being synchronized with the image. The scaled-down image (s) has (have) a difference between adjacent frames of at least the threshold value(s) set by the threshold-value-setting device.

Thus, only the scaled-down image(s) corresponding to the scene change point(s) and having a difference between adjacent frames of at least the set threshold value(s) can be reproduced and displayed with each of the scaled-down image(s) being synchronized with the image. As compared with the case in which all of the recorded scaled-down images are reproduced and displayed, this allows the load during the display of the scaled-down image(s) to be reduced. It also allows unevenness in the time to display the scaled-down image(s) based on an imbalance in the number of scene change points to decrease.

Alternatively, according to another embodiment of the present invention, there is provided a method for reproducing an image. The image is recorded with a difference between adjacent frames at at least one scene change point and a scaled-down image for identifying each scene change point. The image is to be displayed on a screen of a display device. The method includes a step of determining a length of time to display the scaled-down image, the length of time corresponding to a frame length of the display device screen. The method also includes the step of determining a number of scaled-down images to be displayed during the length of time. The method further includes the step of setting a threshold value for the difference between adjacent frames. The difference is recorded during the length of time to allow a number of scaled-down images corresponding to the determined number of scaled-down images to be extracted. The method further includes the step of reproducing and displaying the scaled-down image corresponding to the at least one scene change point with the scaled-down image being synchronized with the image. The scaled-down image has a difference between adjacent frames of at least the threshold value.

According to a further embodiment of the present invention, there is provided a recording medium recorded with a computer program for allowing a computer to execute a method for reproducing an image. The image is recorded with a difference between adjacent frames at at least one scene change point and a scaled-down image for identifying each scene change point. The image is to be displayed on a screen of a display device. The method includes the step of determining a length of time to display the scaled-down image, the length of time corresponding to a frame length of the display device screen. The method also includes the step of determining a number of scaled-down images to be displayed during the length of time. The method further includes the step of setting a threshold value for the difference between adjacent frames. The difference is recorded during the length of time to allow a number of scaled-down images corresponding to the determined number of scaled-down images to be extracted. The method still further includes the step of reproducing and displaying the scaled-down image corresponding to the at least one scene change point with the scaled-down image being synchronized with the image. The scaled-down image has a difference between adjacent frames of at least the threshold value.

In these embodiments of the present invention, by the method for reproducing the image and the recording medium recorded with the computer program for allowing a computer to execute this method, only the scaled-down image(s) corresponding to the scene change point(s) and having a difference between adjacent frames of at least the threshold value(s) can be reproduced and displayed with each of the scaled-down image(s) being synchronized with the image. As compared with the case in which all of the recorded scaled-down images are reproduced and displayed, this allows the load during the display of the scaled-down image(s) to be reduced. It also allows unevenness in the time to display the scaled-down image(s) based on an imbalance in the number of scene change points to decrease.

According to these embodiments of the apparatus, the method and the like of the invention, in order to reproduce an image recorded with a difference between adjacent frames at a scene change point(s) and a scaled-down image (s) for identifying the scene change point(s), a length of time is determined for displaying the scaled-down image(s), the length of time corresponding to the frame length of a screen on which the image is reproduced and displayed, the number of scaled-down image(s) to be displayed during the length of time is determined, and a threshold value(s) is (are) set for the difference between adjacent frames that is (are) recorded during the length of time, thus allowing a number of scaled-down image(s) corresponding to the determined number of scaled-down image(s) to be extracted.

By the above configuration, only the scaled-down image (s) corresponding to the scene change point(s) and having a difference between adjacent frames of at least the threshold value(s) can be reproduced and displayed with each of the scaled-down images being synchronized with the image. As compared with the case in which all of the recorded scaled-down images are reproduced and displayed, this allows the load during the display of the scaled-down image(s) to be reduced. Thus, even in an image-processing system having a low operating speed, it is possible to reproduce and display on one screen the limited number of scaled-down image(s) as an index for searching for a reproduction start point with each of the limited scaled-down images being synchronized with the image. This allows the provision of an inexpensive apparatus for reproducing an image as compared to past devices.

According to these embodiments of the apparatus, the method and the like of the invention, it is possible to set the threshold value variably according to the length of time to be recorded in which the scaled-down image(s) is (are) displayed. This allows a fixed number of the scaled-down image(s) to be reproduced and displayed with each of them being synchronized with the image regardless of any imbalance in the number of scene change points. Thus, it allows unevenness in the time to display the scaled-down image(s) based on an imbalance in the number of scene change points to decrease.

The concluding portion of this specification particularly points out and directly claims the subject matter of the present invention. However, those skilled in the art will best understand both the organization and method of operation of the invention, together with further advantages and the like thereof, by reading the remaining portions of the specification in view of the accompanying drawing(s) wherein like reference characters refer to like elements.

DETAILED DESCRIPTION

Figure 1:
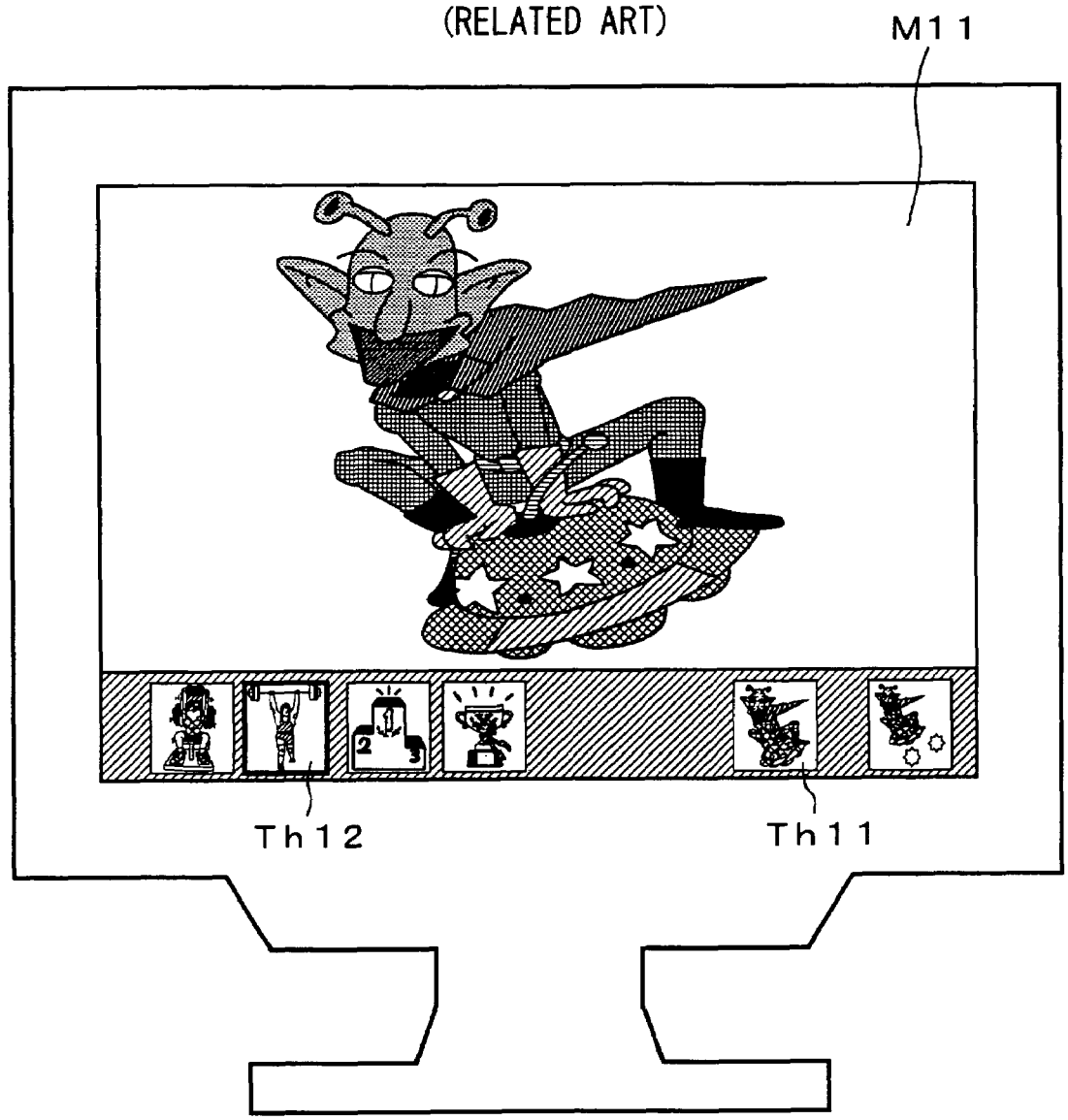
FIG. 1 is a conceptual illustration for roughly illustrating an example of image reproduction.
Figure 2:
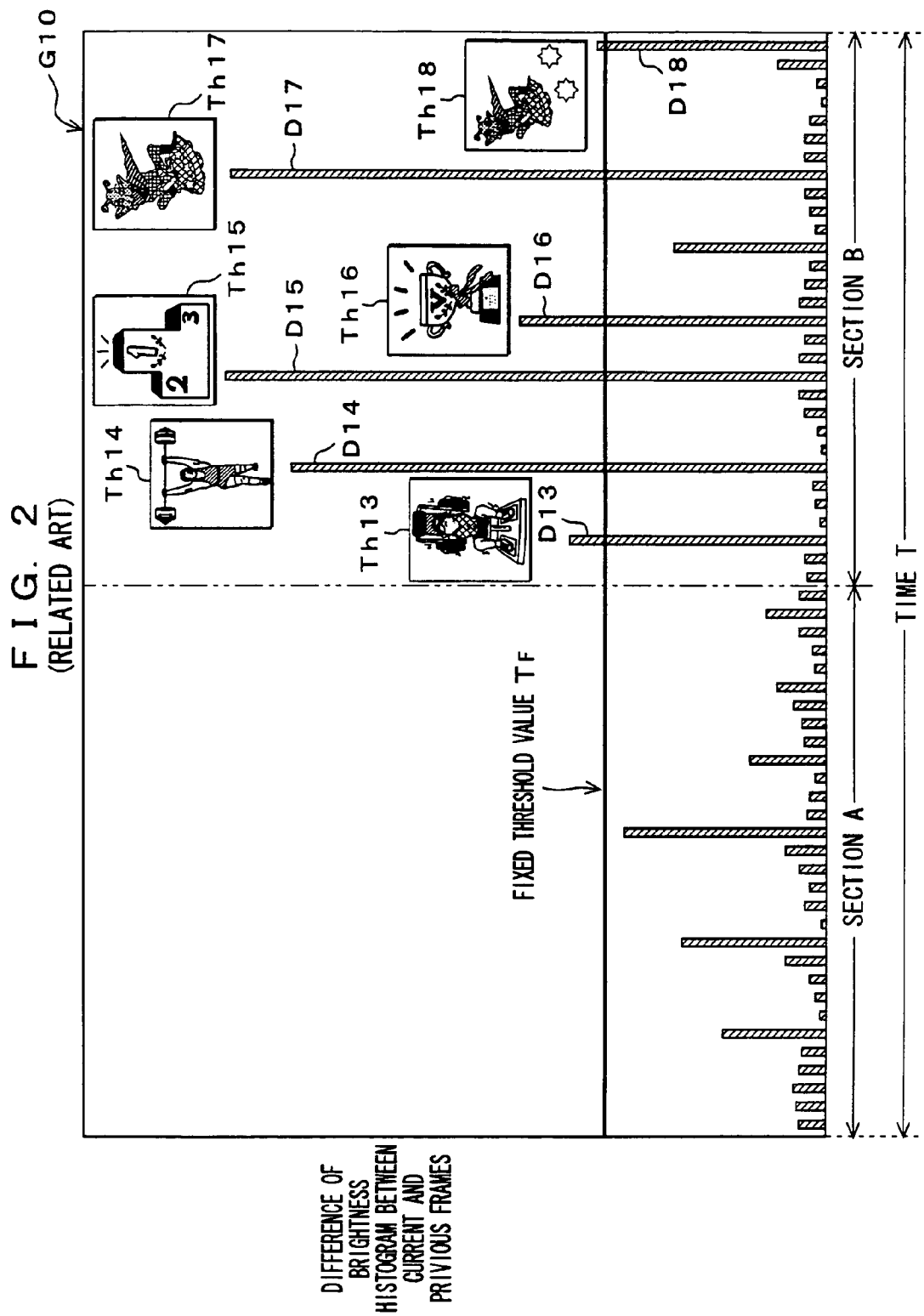
FIG. 2 is a conceptual illustration for roughly illustrating an example of setting a fixed threshold value.
Figure 3:
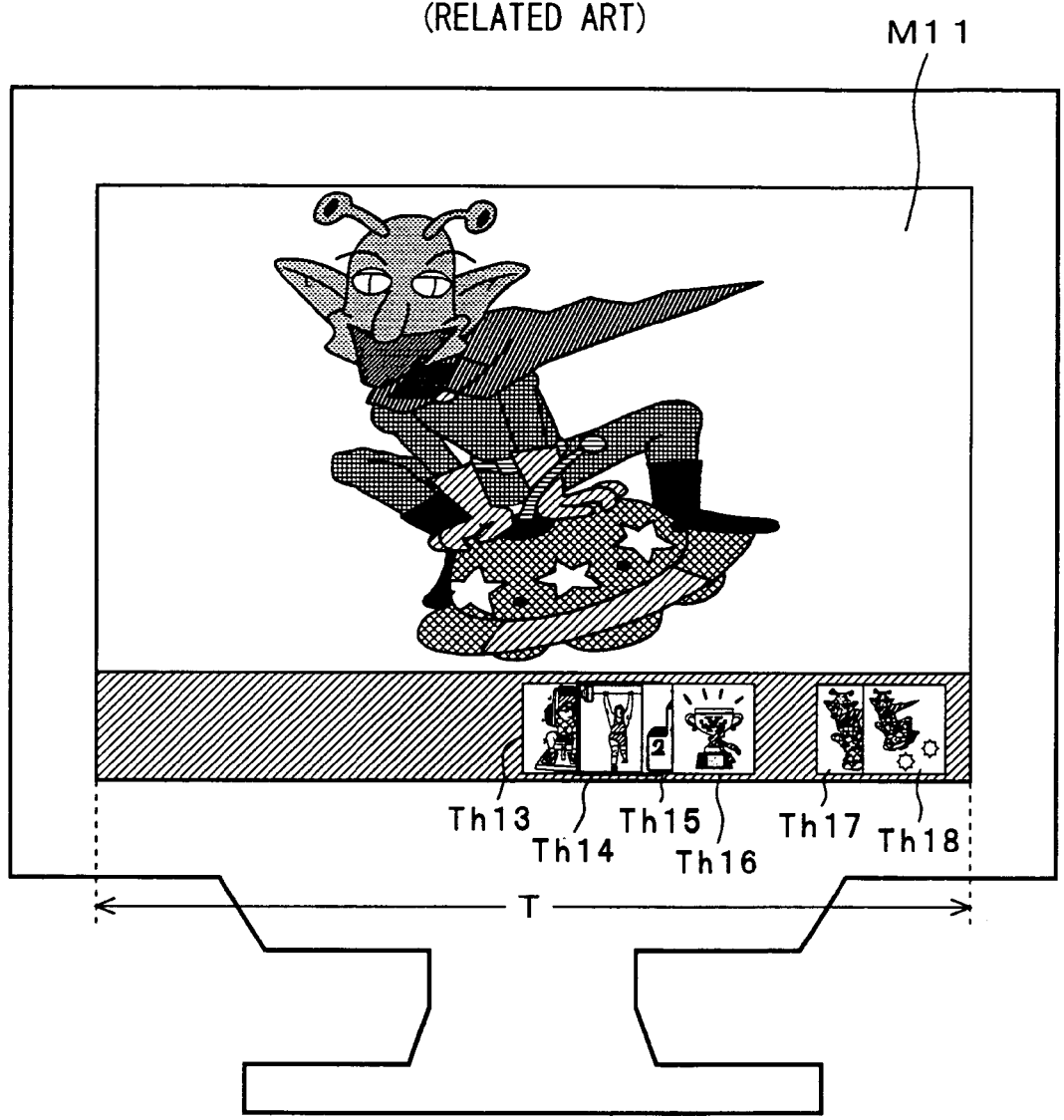
FIG. 3 is a conceptual illustration for roughly illustrating an example of image reproduction.

Referring to the drawings, the invention will now be described in detail with reference to preferred embodiments of an apparatus and a method for reproducing an image, and a computer program product for allowing a computer to execute the method for reproducing the image.

In a preferred embodiment, a threshold value is set (or threshold values are set) for the differences between adjacent frames recorded during a length of time corresponding to the frame length of a screen in which the image is reproduced and displayed so that a number of scaled-down images corresponding to the number of scaled-down images to be displayed during the length of time can be extracted. Thus, only the scaled-down images corresponding to the scene change points and having a difference between adjacent frames of at least the set threshold value can be reproduced and displayed with each of the scaled-down images being synchronized with the image.

Figure 4:
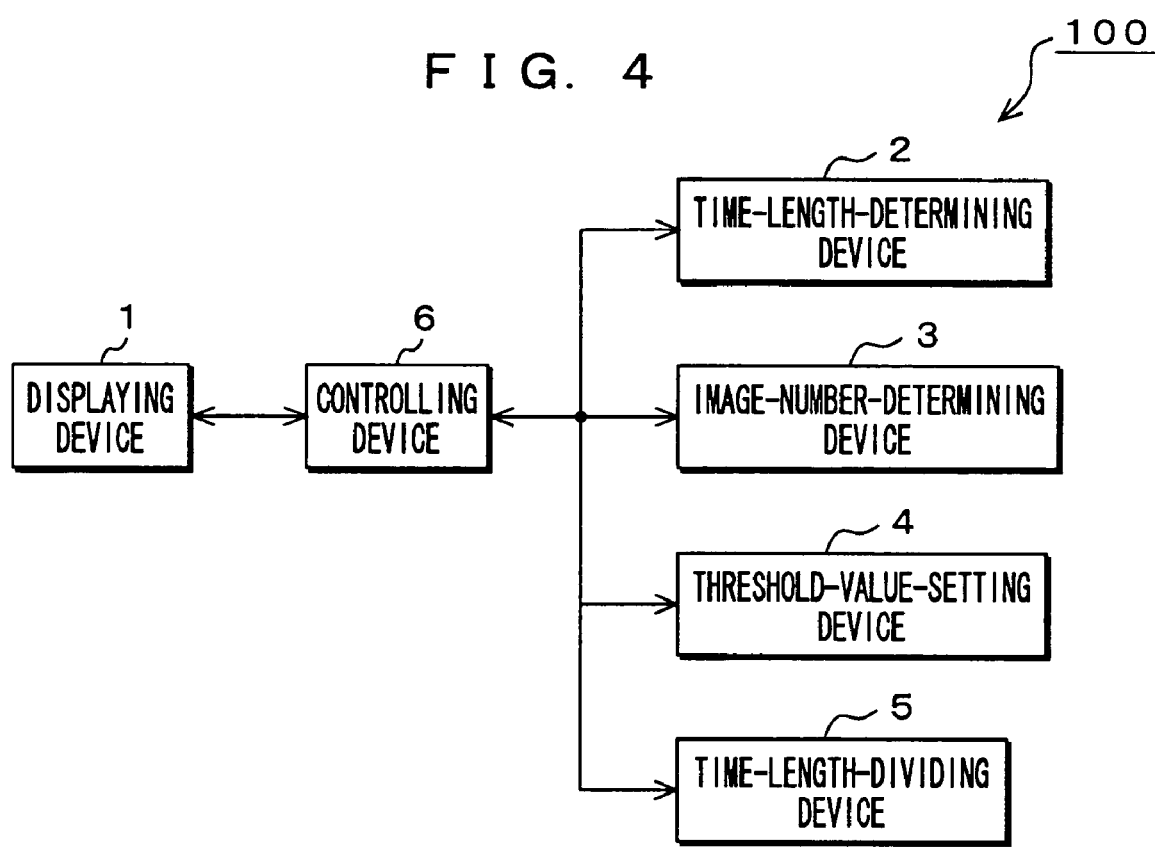
FIG. 4 is a block diagram for showing the configuration of an embodiment of an apparatus for reproducing an image according to the invention.

FIG. 4 shows the configuration of an embodiment of an apparatus 100 for reproducing an image according to the invention. The apparatus 100 reproduces an image (a video image) recorded with a difference between adjacent frames at a scene change point and scaled-down images (thumbnail images) for searching for the scene change points. The apparatus 100 has a displaying device 1, a time-length-determining device 2, an image-number-determining device 3, a threshold-value-setting device 4, a time-length-dividing device 5, and a controlling device 6, as shown in FIG. 4.

The displaying device 1 is connected to the controlling device 6 and reproduces and displays the video image on a screen under control of the controlling device 6. The time-length-determining device 2 determines, under control of the controlling device 6, the length of time to display the thumbnail images corresponding to the frame length of the screen of the displaying device 1. The image-number-determining device 3 is connected to the controlling device 6 and determines the number of thumbnail images to be displayed during the length of time determined by the time-length-determining device 2.

The threshold-value-setting device 4 is connected to the controlling device 6 and sets the threshold value(s) of the difference(s) between adjacent frames which are recorded during the length of time determined by the time-length-determining device 2, so that a number of thumbnail images corresponding to the number of thumbnail images determined by the image-number-determining device 3 can be extracted.

In this embodiment, frames having a difference in brightness histogram between a current frame and a preceding frame that exceeds a predetermined standard (a threshold value) are determined to be scene change points. The difference between a frame in connection with the scene change point and a preceding frame is then used as the difference between adjacent frames. Thus, the threshold-value-setting device 4 sets a threshold value that can vary dynamically to the brightness difference between a current frame at the scene change point and a preceding frame.

The time-length-dividing device 5 is connected to the controlling device 6 and further divides the length of time determined by the time-length-determining device 2. If the time-length-dividing device 5 divides the length of time, the image-number-determining device 3 determines the number of thumbnail images to be displayed during the length of time divided by the time-length-dividing device 5 and the threshold-value-setting device 4 sets the threshold value(s) for the brightness differences which are recorded during the length of time divided by the time-length-dividing device 5.

The controlling device 6 is connected to the displaying device 1, the time-length-determining device 2, the image-number-determining device 3, the threshold-value-setting device 4, and the time-length-dividing device 5, respectively. The controlling device 6 controls operations of the displaying device 1 to reproduce and display the thumbnail images corresponding to the scene change points and having a difference between adjacent frames of at least the threshold value set by the threshold-value-setting device 4 with each of the thumbnail images being synchronized with the video image.

Figure 5:
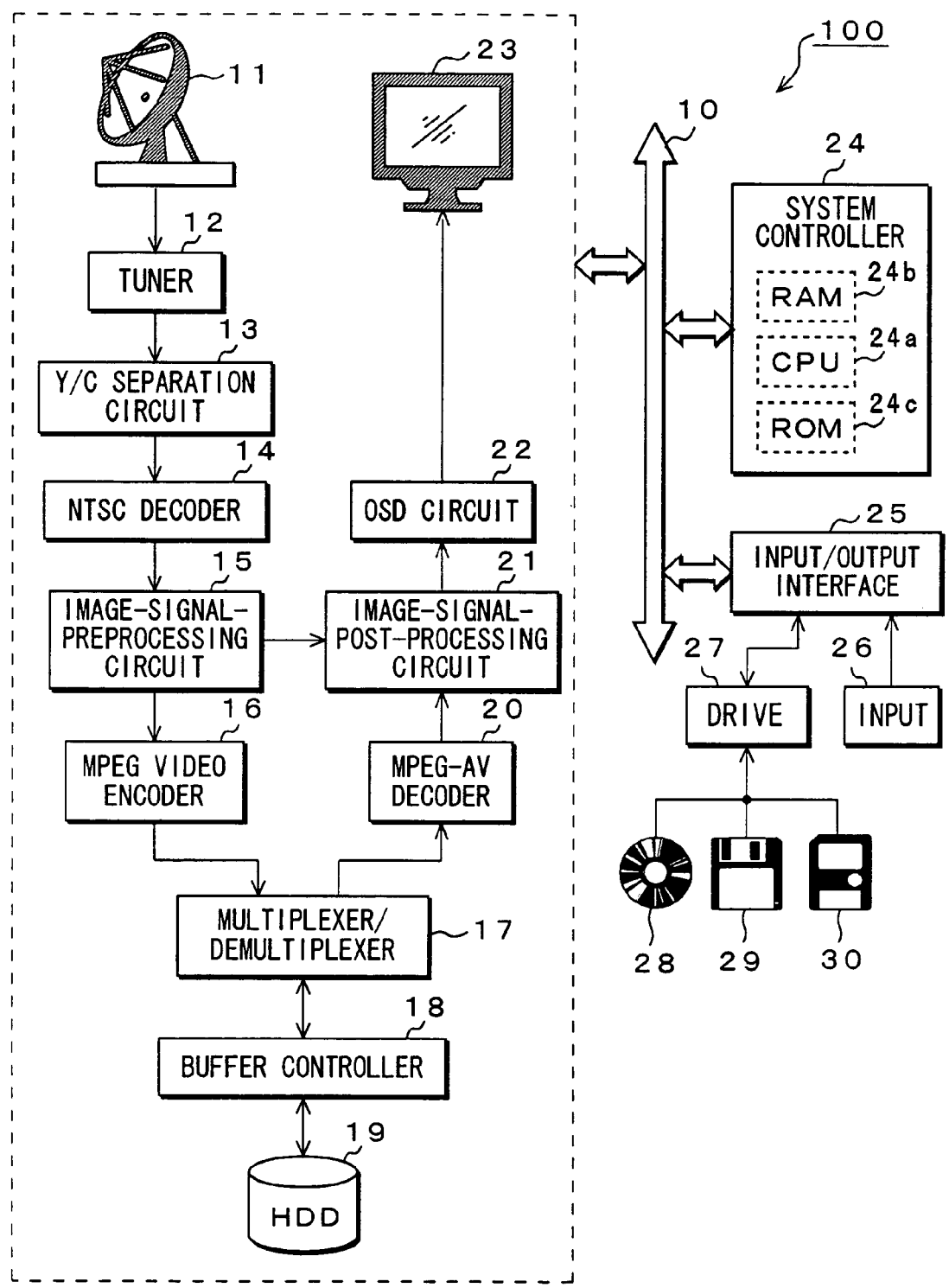
FIG. 5 is a block diagram for showing the hardware configuration of an embodiment of an apparatus for reproducing an image according to the invention.

For example, an embodiment of the apparatus 100 thus configured that reproduces an image according to the invention is implemented by incorporating it into the hardware configuration shown in FIG. 5. In the apparatus 100, antenna 11 is a well-known antenna for receiving a television broadcast signal and is connected with a tuner 12. The antenna 11 receives a signal of a television broadcast wave and transmits this received signal to the tuner 12.

The tuner 12 is connected to the antenna 11 and to a Y/C separation circuit 13. The tuner 12 tunes a signal of television broadcast waves received from the antenna 11 to a desired channel signal and transmits this channel signal to the Y/C separation circuit 13.

The Y/C separation circuit 13 is connected to the tuner 12 and to a national TV standard committee (NTSC) decoder 14. The circuit 13 separates an image signal in the channel signal received from the tuner 12 into a brightness signal (Y signal) and a color signal (C signal) and transmits the separated image signal to the NTSC decoder 14.

The NTSC decoder 14 is connected to the Y/C separation circuit 13 and to an image-signal-preprocessing circuit 15. The decoder 14 performs an A/D conversion process, a chroma-encoding process and the like on the image signal received from the Y/C separation circuit 13, converts the signal thus processed to a digital component video signal (hereinafter referred to as a "DCV signal"), and transmits the DCV signal to the image-signal-preprocessing circuit 15.

The image-signal-preprocessing circuit 15 is connected to the NTSC decoder 14, a moving picture coding experts group (MPEG) video encoder 16, and an image-signal-post-processing circuit 21, respectively. The circuit 15 produces a brightness histogram of each field from the DCV signal that is received from the NTSC decoder 14, searches for any scene change points in which the histogram difference between time-adjacent frames exceeds a predetermined standard, and transmits the image data of the frame at this scene change point to the image-signal-post-processing circuit 21.

The image-signal-preprocessing circuit 15 also transmits the DCV signal to the MPEG video encoder 16 together with the image data of the frame at the scene change point.

The MPEG video encoder 16 is connected to the image-signal-preprocessing circuit 15 and to a multiplexer/demultiplexer 17, respectively. The encoder 16 performs an encoding process such as discrete cosine transform (DCT) on the DCV signal that is received from the image-signal-preprocessing circuit 15, produces an image packetized elementary stream (an image PES) based on the MPEG standard, and transmits the image PES to the multiplexer/demultiplexer 17.

The multiplexer/demultiplexer 17 is connected to the MPEG video encoder 16, a buffer controller 18, an MPEG-AV decoder 20, an MPEG audio encoder, which is not shown, and the like, respectively.

When recording a video image, the multiplexer/demultiplexer 17 performs a multiplexing process on the image PES, audio PES, various kinds of control signals or the like that are received from the MPEG video encoder 16, the MPEG audio encoder, and the like to produce a transport stream based on the MPEG standard, and transmits the transport stream to the buffer controller 18.

When reproducing the video image, the multiplexer/demultiplexer 17 also performs a demultiplexing process on the transport stream received from the buffer controller 18 to separate the image PES and audio PES therefrom and transmits these separated PESs to the MPEG-AV decoder 20.

The buffer controller 18 is connected to the multiplexer/demultiplexer 17 and to a hard disk drive (HDD) 19, respectively. The buffer controller 18 intermittently transmits the transport stream received successively from the multiplexer/demultiplexer 17 to control the HDD 19 so that it can be recorded on the HDD 19. The buffer controller 18 also successively transmits the transport stream read out from the HDD 19 to the multiplexer/demultiplexer 17 by controlling, in the buffer, data intermittently received from the HDD 19 so that the data can be combined with each other.

The HDD 19 is connected to the buffer controller 18. The HDD 19 records the transport stream received intermittently from the buffer controller 18 on a set address thereof and reads the recorded transport stream from the set address and transmits it to the buffer controller 18.

The MPEG-AV decoder 20 is connected to the multiplexer/demultiplexer 17 and to the image-signal-post-processing circuit 21, respectively. The decoder 20 separates PESs received from the multiplexer/demultiplexer 17 into image PESs and audio PESs to perform a desired decoding process on the image PESs and the audio PESs, and then transmits image data of a base band to the image-signal-post-processing circuit 21 and audio data of a base band to an audio-signal-processing circuit, which is not shown, respectively.

The image-signal-post-processing circuit 21 is connected to the image-signal-preprocessing circuit 15, the MPEG-AV decoder 20, and an on-screen-display (OSD) circuit 22, respectively. The image-signal-post-processing circuit 21 performs a compressing process on image data at each scene change point that is received from the image-signal-preprocessing circuit 15 to produce any thumbnail images. The image-signal-post-processing circuit 21 then produces an image display window or the like as a graphic user interface (GUI) and incorporates the thumbnail images into the image display window so that they can be displayed, and transmits them to the OSD circuit 22 together with the image data of the base band received from the MPEG-AV decoder 20.

The OSD circuit 22 is connected to the image-signal-post-processing circuit 21 and to a display 23, respectively. The OSD circuit 22 superimposes the image display window into which the thumbnail images have been incorporated by the image-signal-post-processing circuit 21 on the image data of the base band and transmits them to the display 23.

The display 23 is illustrated as a liquid crystal display (LCD) having an image display function and is connected to the OSD circuit 22. The display 23 reproduces and displays the thumbnail images as an index for searching an image on a screen thereof with the thumbnail images being superimposed on a video image, by changing its display based on the image data received from the OSD circuit 22.

The above units are respectively connected to a system controller 24 through a bus 10 so that the system controller 24 can control their operations. An input/output interface 25 is also connected to the bus 10.

The system controller 24 includes a central processing unit (CPU) 24a, a random access memory (RAM) 24b, and a read only memory (ROM) 24c. The system controller 24 executes a control program stored in the ROM 24c with the RAM 24b being used as a working area, so that the system controller 24 can control the operations of the units in the apparatus 100 for reproducing the image through the bus 10.

The input/output interface 25 is connected to an input unit 26, a drive unit 27, and the bus 10, respectively. The input unit 26 may be, for example, a keyboard, a mouse, a remote controller, or a transparent touch panel incorporated into the screen of the display 23. The input unit 26 functions as a user interface for operating the apparatus 100 to reproduce the image. Thus, the input/output interface 25 transmits input from the input unit 26 to the system controller 24.

The drive unit 27 is connected to the input/output interface 25. An optical recording medium 28 such as a CD-ROM or a DVD, a magnetic recording medium 29 such as a floppy disk, or a semiconductor memory 30 such as a memory stick is inserted into drive unit 27 to read the data therefrom. Thus, the drive unit 27 can read the recorded data out from the recording medium 28, 29, 30, and supply the read data to the system controller 24 through the input/output interface 25.

Thus, the apparatus 100 for reproducing the image can reproduce and display various kinds of content such as a moving picture recorded on the optical recording medium 28, the magnetic recording medium 29, or the semiconductor memory 30 in addition to an image of a television broadcast received via the antenna 11 and an image read out of the HDD 19.

The following will describe the relationship between the block diagrams shown in FIGS. 4 and 5. In the embodiment of the apparatus 100 for reproducing the image, the image-signal-preprocessing circuit 15, the image-signal-post-processing circuit 21, the OSD circuit 22, and the display 23 function as the displaying device 1.

The ROM 24c previously stores an embodiment of a program according to the invention. The CPU 24a executes the program stored in the ROM 24c, so that it can function as the time-length-determining device 2, the image-number-determining device 3, the threshold-value-setting device 4, the time-length-dividing device 5, and the controlling device 6. The CPU 24a, the RAM 24b, and the ROM 24c can be implemented using a well-known computer system.

If power is supplied to an apparatus 100 for reproducing the image that has such a configuration and a user operates the apparatus 100 via an input unit 26, such as a remote controller, to select and reproduce content stored on the HDD 19, for example, in connection with the content selected by the remote controller, the time-length-determining device 2 determines a length of time T for displaying the thumbnail images corresponding to the frame length of the screen in which the video image is reproduced and displayed, in order to reproduce and display the thumbnail images for searching for a scene change point with each of the thumbnail images being synchronized with the video image.

Figure 6:
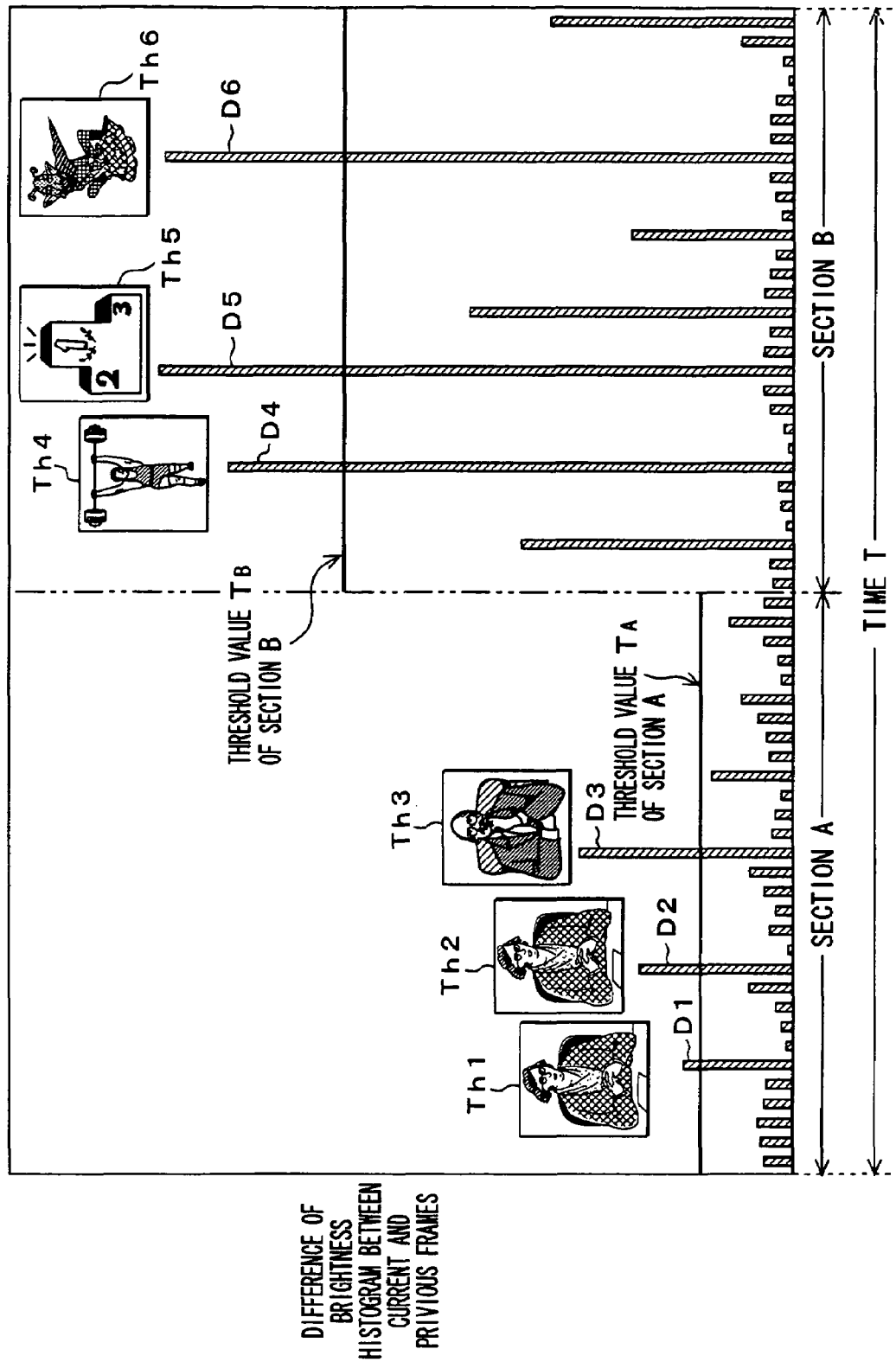
FIG. 6 is a conceptual illustration for roughly illustrating an example of setting fixed threshold values according to an embodiment of the invention.

Next, the time-length-dividing device 5 divides the length of time T into two sections so that a length of time "t" (t=T/2), which is shorter than the length of time T, can be determined. As shown in FIG. 6, the content is divided into two sections, section A and section B, which have the same length of time "t". The image-number-determining device 3 then determines the number of thumbnail images, for example, three images, to be displayed during the length of time "t".

The threshold-value-setting device 4 detects scene change levels at scene change points recorded during each section on the content thus divided into two sections A and B. All the scene change points are sorted in ascending order of the scene change levels. Thereby, the threshold-value-setting device 4 can set a threshold value for the scene change levels recorded during the length of time "t" so that three thumbnail images corresponding to the number of thumbnail images determined by the image-number-determining device 3 can be extracted.

In section A, the threshold-value-setting device 4 sets a threshold value TA on the scene change levels recorded during section A so that the difference between the current and previous frames having the third highest scene change point in section A is included. This allows inclusion of the thumbnail images Th1, Th2, and Th3 corresponding to the third highest scene change level D1 through the highest scene change level D3.

Similarly, in section B, the threshold-value-setting device 4 sets a threshold value TB on the scene change levels recorded during section B so that the difference between the current and previous frames having the third highest scene change point in section B is included. This allows inclusion of the thumbnail images Th5, Th6, and Th4 corresponding to the highest scene level point D5, the next highest scene change level D6, and the third highest scene change level D4, respectively.

Thus, dynamically changing the threshold values according to the scene change levels recorded during each of sections A and B having the length of time "t" allows three thumbnail images for each of sections A and B to be displayed. Such reproduction processing with a total of six thumbnail images being respectively synchronized with the video image can be carried out by even a low speed CPU without any problems. A relatively low speed CPU for an embedded system, for example, a CPU having an operating speed of about 300 MHz, can execute such reproduction processing with each of the thumbnail images being synchronized with the video image. This allows an inexpensive apparatus for reproducing an image to be presented.

Figure 7:
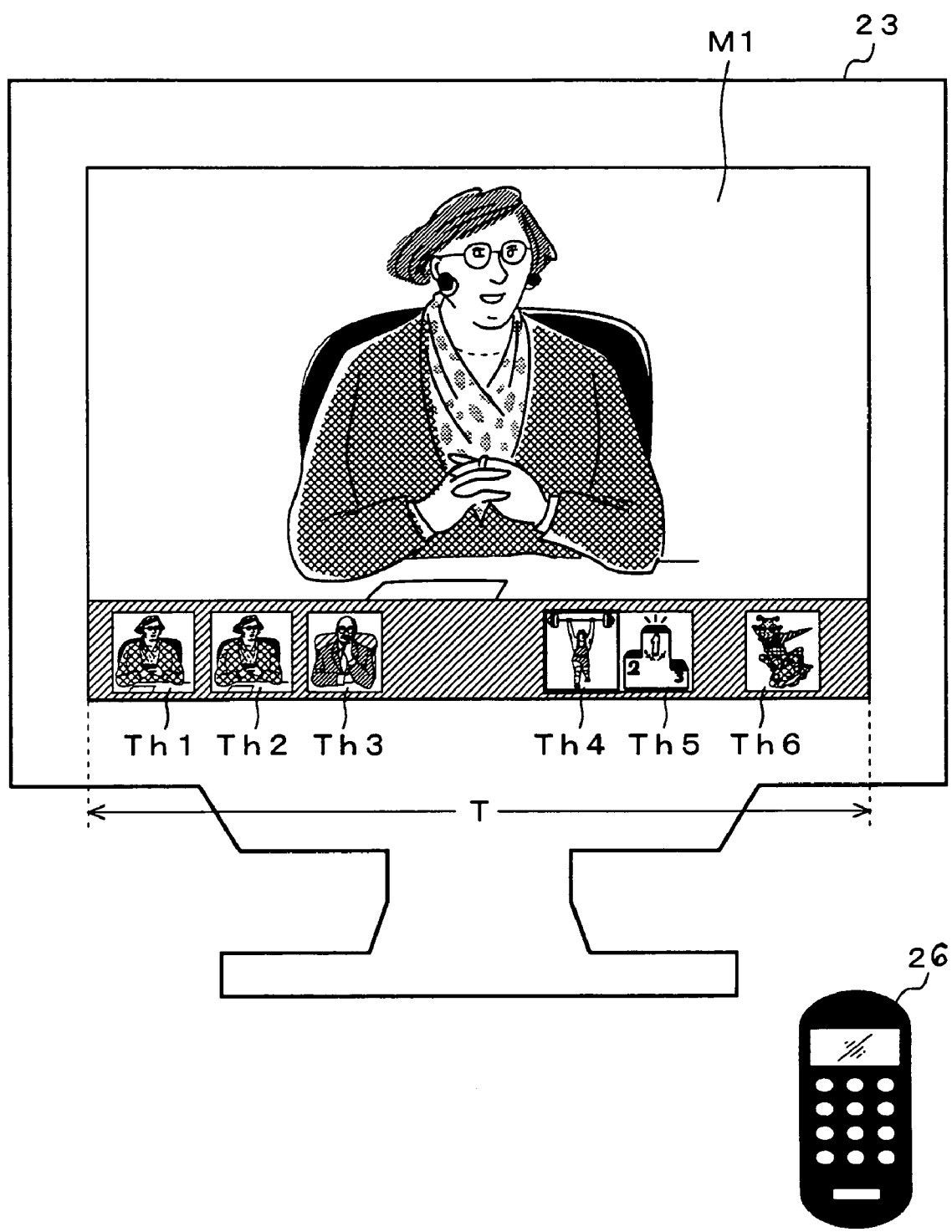
FIG. 7 is a conceptual illustration for roughly illustrating an example of displaying thumbnail images according to an embodiment of the invention.

FIG. 7 roughly illustrates an example of displaying the thumbnail images that are extracted according to the above methods. When the length of time T corresponds to the horizontal frame length of the screen of the display 23, as shown in FIG. 7, the thumbnail images Th1, Th2, and Th3 corresponding to the scene change points D1, D2, and D3, respectively, that exceed the threshold value TA during section A, and the thumbnail images Th4, Th5, and Th6 corresponding to the scene change points D4, D5, and D6, respectively, that exceed the threshold value TB during section B, can be reproduced and displayed on the same screen in synchronization with the video image M1.

Thus, in the example of displaying the thumbnail images shown in FIG. 7, in section A where few scene changes occur as a newscaster announces the news, a low threshold value TA is set according to the scene change levels, so that the thumbnail images Th1, Th2, and Th3 of the newscaster can be displayed. As compared to the case in which one fixed threshold value TF is set, this allows a decrease in the unevenness in the time to display the thumbnail images based on an imbalance in the number of scene change points resulting from a variation of the scene change levels.

On the other hand, in section B where many scene changes occur, a high threshold value TB is set so that a limited number of thumbnail images are displayed. This prevents plural thumbnail images from being displayed in an overlapping manner. Thus, the proper number of thumbnail images is displayed according to the recording situation of the content, so that a user can know the content of the scene corresponding to each thumbnail image.

For example, the user can know the reproduction position in the content based on the thumbnail image Th2 while he or she views the video image M1 being reproduced. Alternatively, by selecting the thumbnail image Th4 using the input unit 26, such as a remote controller, it is possible to change the reproduction start position thereof to the scene change point corresponding to thumbnail image Th4, thereby obtaining an excellent operation quality in forward or reverse reproduction, for example, to enhance customer convenience.

Figure 8A:
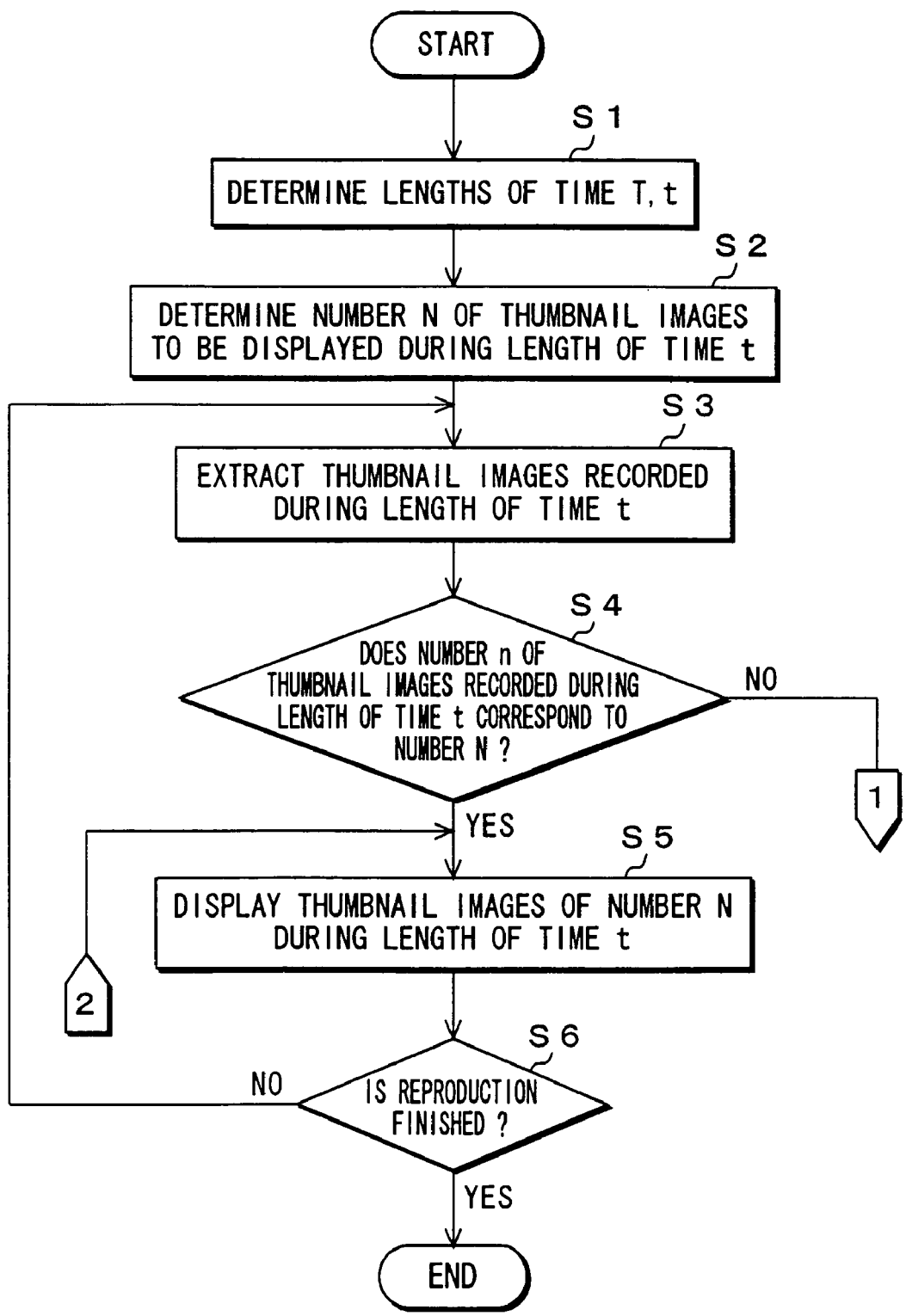
FIG. 8A is a flowchart for showing an embodiment of a method for reproducing an image according to the invention.
Figure 8B:
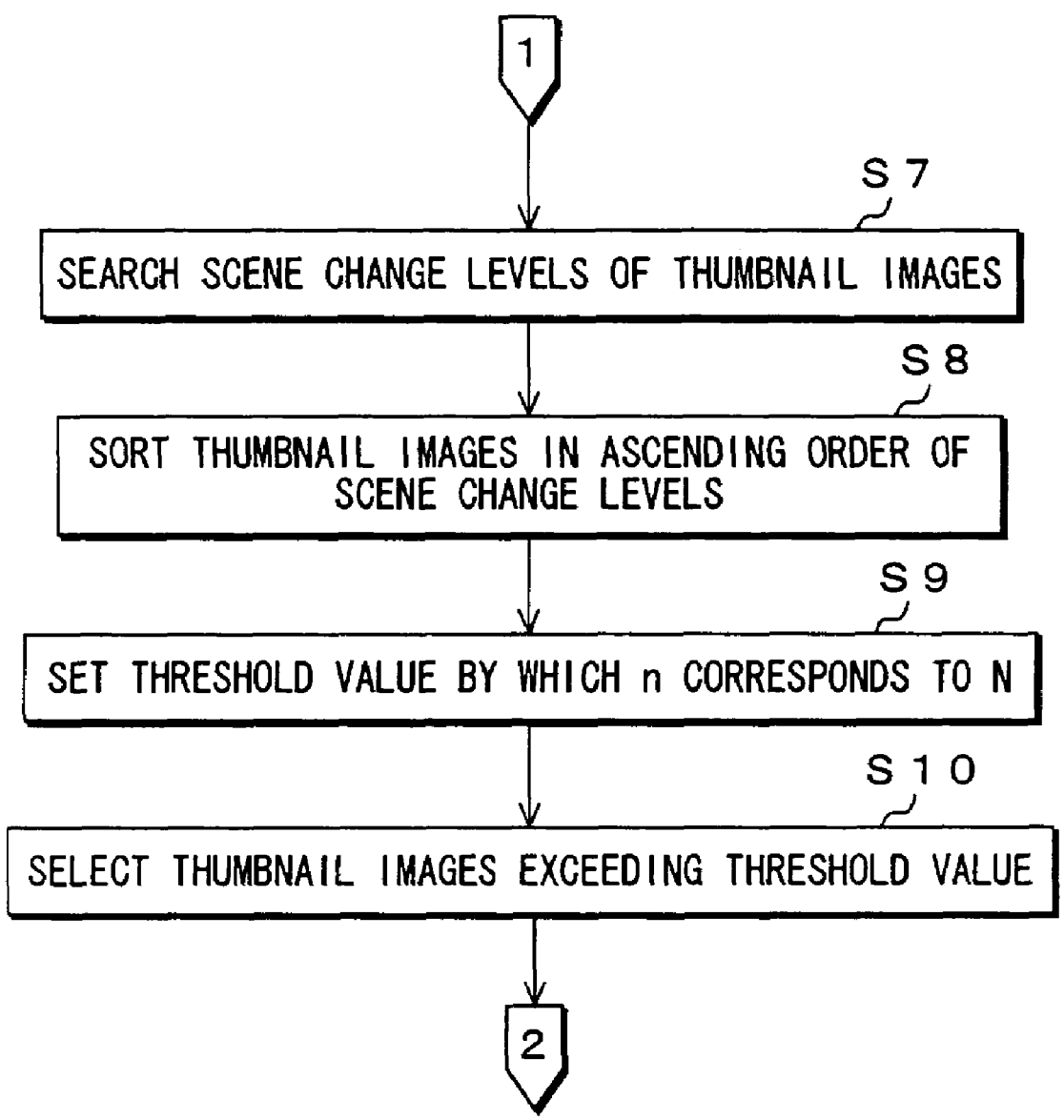
FIG. 8B is a further flowchart for showing an embodiment of a method for reproducing an image according to the invention.

The following will describe an example of image reproduction by the above apparatus 100 as embodiments of a method for reproducing an image and a program for allowing a computer to execute the method according to the invention, with reference to the flowcharts shown in FIGS. 8A and 8B.

Suppose that the program for allowing a computer to execute an embodiment of the method for reproducing an image according to the invention is previously stored in the ROM 24c. The CPU 24a puts the program in motion to execute the method for reproducing the image so that an image recorded with brightness histogram differences between the current and previous frames at each scene change point and thumbnail images for searching for the scene change point can be reproduced.

Assuming the above, at Step S1 of the process in the flowchart shown in FIG. 8A, the time-length-determining device 2 determines a length of time T to display the thumbnail images on a screen corresponding to the frame length of the screen in which the video image is reproduced and displayed. The time-length-dividing device 5 divides the length of time T to determine the length of time "t".

At Step S2, the image-number-determining device 3 determines the number N of thumbnail images to be displayed during section A divided so as to have the length of time "t". At Step S3, the thumbnail images recorded during the length of time "t" are extracted. At Step S4, if the number n of thumbnail images recorded during t minute(s) corresponds to the number N of thumbnail images determined by the image-number-determining device 3, the process goes to Step S5 where N thumbnail images are displayed during the length of time "t", with each of them being synchronized with the video image. The process then goes to Step S6.

At Step S6, if an instruction for finishing the reproduction is supplied through the input unit 26, the reproduction of images finishes. If the reproduction is not finished at Step S6, the process goes back to Step S3 where the thumbnail images recorded as the content during next length of time "t" are extracted.

At Step S4, if the number n of thumbnail images recorded during t minute(s) does not correspond to the number N of thumbnail images determined by the image-number-determining device 3, the process goes to Step S7 of the flowchart shown in FIG. 8B.

At Step S7, the threshold-value-setting device 4 searches for the scene change levels corresponding to the thumbnail images recorded during the length of time "t". At Step S8, the thumbnail images are sorted in an ascending order of the scene change levels.

At Step S9, the threshold-value-setting device 4 sets a threshold value TA by which the number n of thumbnail images recorded during t minute(s) corresponds to the number N of thumbnail images to be displayed as determined by the image-number-determining device 3. At Step S10, the thumbnail images Th1, Th2, and Th3 corresponding to the scene change levels D1, D2, and D3, respectively, that exceed the threshold value TA are selected and the process goes back to Step S5 of the flowchart shown in FIG. 8A.

At Step S5, the N (in this case three) thumbnail images Th1, Th2, and Th3 are displayed during the length of time "t", with each of them being synchronized with the video image M1 and the process goes to Step S6.

At Step S6, if an instruction for finishing the reproduction is supplied through the input unit 26, the reproduction of images finishes. If the reproduction is not finished at Step S6, the process goes back to Step S3 where the thumbnail images recorded as the content during section B that is the next length of time "t" are extracted. The same image reproduction process as that carried out in the above section A is then carried out.

Thus, only thumbnail images corresponding to the scene change points that exceed the threshold values TA and TB set according to the content recorded during a length of time are displayed with each of them being synchronized with the video image. This allows the loads during display processing of the thumbnail images to decrease as compared to the case in which all of the recorded thumbnail images are reproduced and displayed.

If the CPU has a relatively low operating speed, it can reproduce and display the limited number of thumbnail images on a screen as an index for searching for the reproduction start point with each of them being synchronized with the video image. This allows the provision of an inexpensive apparatus for reproducing an image as compared to past devices.

It is also possible to set the threshold values TA and TB variably based on the length of time "t" when the thumbnail images are displayed. This allows a set number of thumbnail images to be reproduced and displayed with each of them being synchronized with the video image regardless of any imbalance in the number of scene change points. Thus, it allows a decrease in the unevenness in the time to display the thumbnail images resulting from an imbalance in the number of scene change points.

The invention has been described in detail with reference to specific embodiments and the excellent effect of the invention in the form of the apparatus 100 and the method for reproducing the image and the program for allowing a computer to execute the method. It should be understood by those skilled in the art that the invention is not limited to these embodiments and that the invention can be applied equally well to any other types of video reproduction apparatus for reproducing an image with each of the thumbnail images for searching the image being synchronized with the video image. While the foregoing specification has described preferred embodiments() of the present invention, those skilled in the art may make many modifications, combinations, sub-combinations and alterations to the preferred embodiment without departing from the invention claimed in the appended claims or the equivalents thereof. The appended claims therefore are intended to cover all such modifications, combinations, sub-combinations and alterations as fall within the true scope of the invention.

Thus, although in the above embodiments according to the invention, the brightness histogram difference between the current and previous frames has been used as the difference between adjacent frames, the difference between adjacent frames is not limited to such brightness difference. For example, a difference in motion vectors between adjacent frames may be detected using any well-known calculus of motion vector differences, and an optionally variable threshold value of the detected vector differences may be set.

Although the above embodiments of the program according to the invention have been previously stored in the ROM 24c, the recording medium on which the program is stored is not limited to the ROM 24c. The HDD 19 may store it. Further, the recording media 28, 29, 30 which can be inserted into the drive unit 27 may store it and read it out.

Further, although in the above embodiments according to the invention, the length of time T corresponds to the horizontal frame length of the screen in which the video image is reproduced and displayed, it goes without saying that the length of time T may correspond to the vertical frame length of the screen. In such event, the excellent effect of the embodiments according to this invention is not changed.

The invention claimed is:

1. An apparatus for reproducing an image recorded with a difference between adjacent frames at at least one scene change point and a scaled-down image for identifying each scene change point, the image to be displayed on a screen of a display device, the apparatus comprising:
a time-length-determining device operable to determine a length of time to display the scaled-down image, the length of time corresponding to a frame length of the display device screen;
an image-number-determining device operable to determine a number of scaled-down images to be displayed during the length of time;
a threshold-value-setting device operable to set a threshold value for the difference between adjacent frames, the difference being recorded during the length of time to allow a number of scaled-down images corresponding to the number of scaled-down images determined by the image-number-determining device to be extracted; and
a controlling device operable to control operation of the display device to reproduce and display the scaled-down image corresponding to the at least one scene change point with the scaled-down image being synchronized with the image, the scaled-down image having a difference between adjacent frames of at least the threshold value.

2. The apparatus according to claim 1, wherein the difference between adjacent frames is a difference in brightness, and the threshold-value-setting device sets the threshold value based on the difference in brightness between adjacent frames.

3. The apparatus according to claim 1, further comprising a time-length-dividing device operable to divide the length of time into time periods, wherein the image-number-determining device determines the number of scaled-down images to be displayed during each of the time periods; and
the threshold-value-setting device sets the threshold value for the difference between adjacent frames, the difference being recorded during each of the time periods.

4. A method for reproducing an image recorded with a difference between adjacent frames at at least one scene change point and a scaled-down image for identifying each scene change point, the image to be displayed on a screen of a display device, the method comprising:
determining a length of time to display the scaled-down image, the length of time corresponding to a frame length of the display device screen;
determining a number of scaled-down images to be displayed during the length of time;
setting a threshold value for the difference between adjacent frames, the difference being recorded during the length of time to allow a number of scaled-down images corresponding to the determined number of scaled-down images to be extracted; and
reproducing and displaying the scaled-down image corresponding to the at least one scene change point with the scaled-down image being synchronized with the image, the scaled-down image having a difference between adjacent frames of at least the threshold value.

5. The method according to claim 4, wherein the difference between adjacent frames is a difference in brightness, and the setting step includes setting the threshold value based on the difference in brightness between adjacent frames.

6. The method according to claim 4, further comprising:
dividing the length of time into time periods; and
determining the number of scaled-down images to be displayed during each of the time periods.

7. A computer readable recording medium storing a computer program for allowing a computer to execute a method for reproducing an image recorded with a difference between adjacent frames at at least one scene change point and a scaled-down image for identifying each scene change point, the image to be displayed on a screen of a display device, the method comprising:
determining a length of time to display the scaled-down image, the length of time corresponding to a frame length of the display device screen;
determining a number of scaled-down images to be displayed during the length of time;
setting a threshold value for the difference between adjacent frames, the difference being recorded during the length of time to allow a number of scaled-down images corresponding to the determined number of scaled-down images to be extracted; and
reproducing and displaying the scaled-down image corresponding to the at least one scene change point with the scaled-down image being synchronized with the image, the scaled-down image having a difference between adjacent frames of at least the threshold value.

* * * * *